United States Patent
Hild et al.

(10) Patent No.: US 6,965,947 B1
(45) Date of Patent: Nov. 15, 2005

(54) METHOD AND APPARATUS FOR AUTOMATED TRANSCODER SELECTION

(75) Inventors: Stefan Georg Hild, Zurich (CH); Sandeep K. Singhal, Englewood Cliffs, NJ (US)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 09/680,792

(22) Filed: Oct. 6, 2000

(51) Int. Cl.[7] ............ G06F 15/16; G06F 15/173
(52) U.S. Cl. ............ 709/246; 709/223; 709/219
(58) Field of Search .............. 709/246–250, 709/310, 123, 223–224, 226–227, 217–219

(56) References Cited

U.S. PATENT DOCUMENTS

| | | | |
|---|---|---|---|
| 5,473,680 A | 12/1995 | Porter | 379/201 |
| 5,848,415 A * | 12/1998 | Guck | 707/10 |
| 5,878,223 A * | 3/1999 | Becker et al. | 709/223 |
| 5,918,013 A * | 6/1999 | Mighdoll et al. | 709/217 |
| 5,935,207 A | 8/1999 | Logue et al. | 709/219 |
| 5,953,506 A | 9/1999 | Kalra et al. | 395/200.61 |
| 6,134,598 A * | 10/2000 | Raman | 709/246 |
| 6,185,625 B1 * | 2/2001 | Tso et al. | 709/247 |
| 6,216,137 B1 * | 4/2001 | Nguyen et al. | 707/203 |
| 6,360,273 B1 * | 3/2002 | Beurket et al. | 709/244 |
| 6,405,244 B1 * | 6/2002 | Bando et al. | 709/206 |
| 6,421,733 B1 * | 7/2002 | Tso et al. | 709/246 |
| 6,457,030 B1 * | 9/2002 | Adams et al. | 715/523 |
| 6,457,049 B2 * | 9/2002 | Lewis et al. | 709/223 |
| 6,507,867 B1 * | 1/2003 | Holland et al. | 709/219 |
| 6,559,966 B1 * | 5/2003 | Laverty et al. | 358/1.15 |
| 6,584,567 B1 * | 6/2003 | Bellwood et al. | 713/171 |
| 6,611,876 B1 * | 8/2003 | Barrett et al. | 709/246 |
| 6,615,212 B1 * | 9/2003 | Dutta et al. | 707/10 |
| 6,715,129 B1 * | 3/2004 | Hind et al. | 715/513 |
| 6,721,803 B1 * | 4/2004 | Kirkeby | 709/246 |
| 6,725,424 B1 * | 4/2004 | Schwerdtfeger et al. | 715/513 |
| 6,801,340 B1 * | 10/2004 | Endo | 358/403 |
| 6,813,248 B1 * | 11/2004 | Boss et al. | 370/252 |

OTHER PUBLICATIONS

Chick Musiciano et al, HTML-The Definitive Guide, O'Reilly, 3rd Edition, pp. 321-329.*

* cited by examiner

*Primary Examiner*—Ario Etienne
*Assistant Examiner*—Hussein El-chanti
(74) *Attorney, Agent, or Firm*—Duke W. Yee; A. Bruce Clay; Wing Y. Mok

(57) ABSTRACT

A method and apparatus for automated transcoder selection in a data processing system for transcoding content using a set of transcoders. A request is received for the content from a client, wherein the request includes a set of characteristics. A transcoder is selected from the set of transcoders having a best match to the set of characteristics. The content is transcoded using the transcoder to form transcoded content.

23 Claims, 6 Drawing Sheets

METHOD AND APPARATUS FOR AUTOMATED TRANSCODER SELECTION

1. Field of the Invention

The present invention relates generally to an improved data processing system, and in particular to a method and apparatus for transferring data between different data processing systems. Still more particularly, the present invention provides a method and apparatus for selecting a transcoder for use in translating content.

2. Background of the Invention

Today, computing functions traditionally found only in desktop or laptop personal computers are being integrated into many different types of devices. For example, personal digital assistants (PDAs), such as the Palm Pilot (available from Palm Computing, Inc.), now often provide for web browsing functions and can be connected to the Internet using wireless modems. These same PDAs can be used to access and download e-mail, as well as execute various custom applications. Browsing capabilities and e-mail access are also found in digital wireless phones such as those communicating using the Wireless Application Protocol (WAP). Computing power also is being introduced into home appliances, such as refrigerators. Other examples of pervasive computing devices include automotive computers that provide browsing, messaging, and emergency communications capabilities; screen phones that mix Web access with voice communications; and Web-enabled televisions that support interactive television programming and Web access.

Pervasive computing aims at enabling a diverse range of devices to access an equally diverse range of data servers. Presently, different types of devices require different types of data format because no one universally accepted content format is present. Instead, a variety of content formats, such as, for example, Hypertext Markup Language (HTML), Wireless Markup Language (WML), Compact HTML (cHTML), VoxML, and VoiceXML are used in different markets or device classes. Presently, content providers are forced to maintain and operate a number of separate servers or server infrastructure elements in which each of these servers or elements provides content and applications for different supported content formats. Such a requirement is costly and burdensome for content providers.

One potential solution to this problem involves the use of transcoders. A transcoder is an infrastructure element that sits between a content source and a device. This element is capable of "translating" content from one format into another, such as the content format delivered by the server into the content format expected by the device. This solution, however, requires significant investment in creating transcoders, installing them, and configuring an appropriate rule base that determines which transcoders to apply to a particular client request and server content. In most existing transcoding systems, generic transcoders are used to convert various server-generated content types into the client-supported content types. These generic transcoders are cheapest to develop, may be used across a large range of content sources, and can support all devices of a particular type. However, because these transcoders are only associated with the source and target content types, they cannot take advantage of any special formatting or features present in the particular source content. Moreover, these transcoders cannot take advantage of any special capabilities present in the client device, nor can they address preferences of the particular user. The alternative approach is to develop specific transcoders for different types of applications or devices or for different individual users. A particular transcoder of this type is limited in the types of content sources, users, or devices that it can handle. A resulting system must therefore include many such transcoders, which increases the overall implementation cost, maintenance cost, and system complexity.

Therefore, it would be advantageous to have an improved method and apparatus for translating content generated by a particular server or application from its source format into a format for use by a target device and a user.

SUMMARY OF THE INVENTION

The present invention provides a method in a data processing system for transcoding content using a set of transcoders. A request is received for the content from a client, wherein the request includes a set of characteristics. A transcoder is selected from the set of transcoders having a best match to the set of characteristics. The content is transcoded using the transcoder to form transcoded content.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
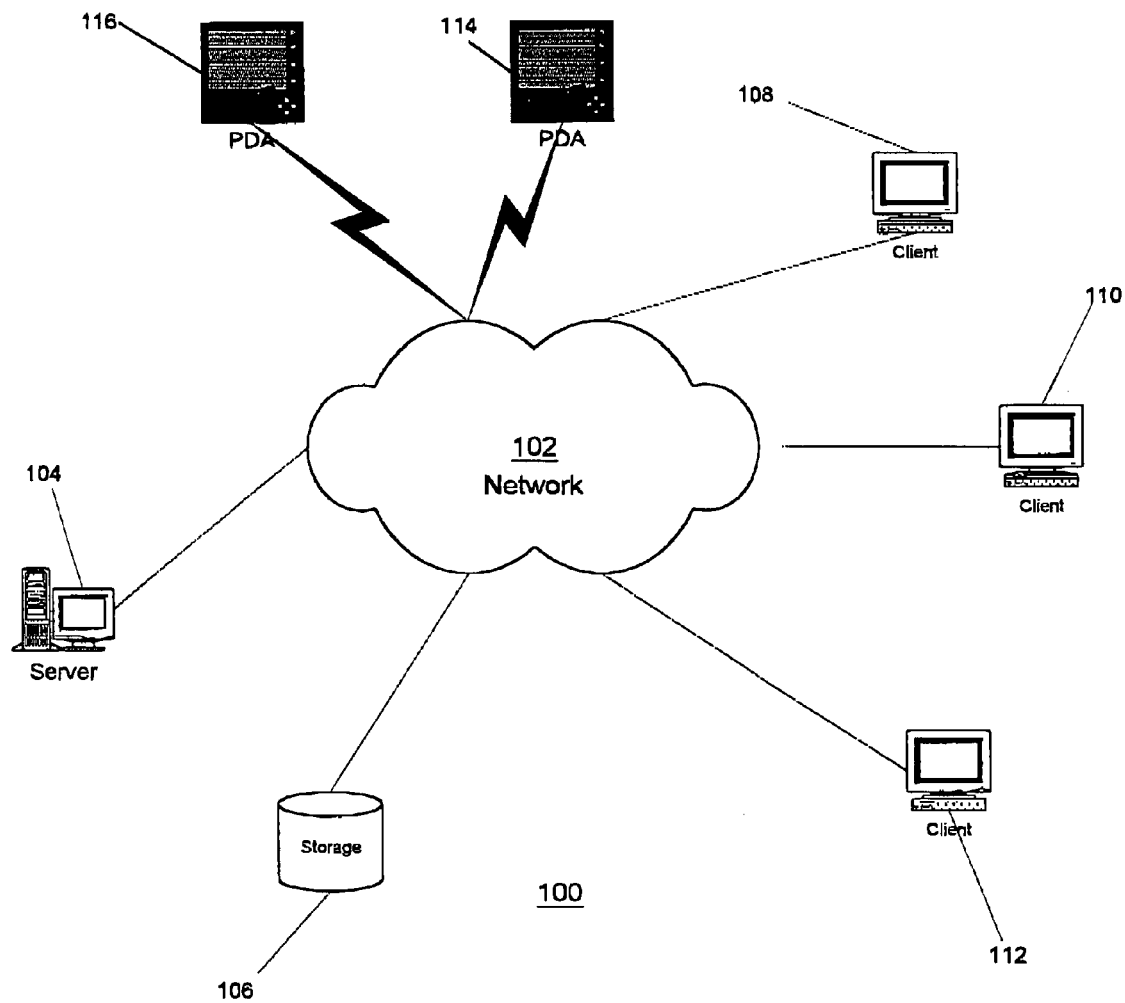
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. Clients 114 and 116 in these examples are pervasive devices, which communicate using wireless communication links. Clients 114 and 116 may be, for example, PDAs or some other hand-held computing device. Although these clients communicate with network 102 using wireless links, a physical connection, such as a phone line or Ethernet connection may be used.

In the depicted example, server 104 provides data, such as boot files, operating system images, and applications to clients 108–116. Clients 108–116 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), and or a wide area network (WAN). These networks also include mechanisms for wireless communications links in these examples. FIG. 1 is intended as an example, and not as an architectural limitation for the present invention.

Figure 2:
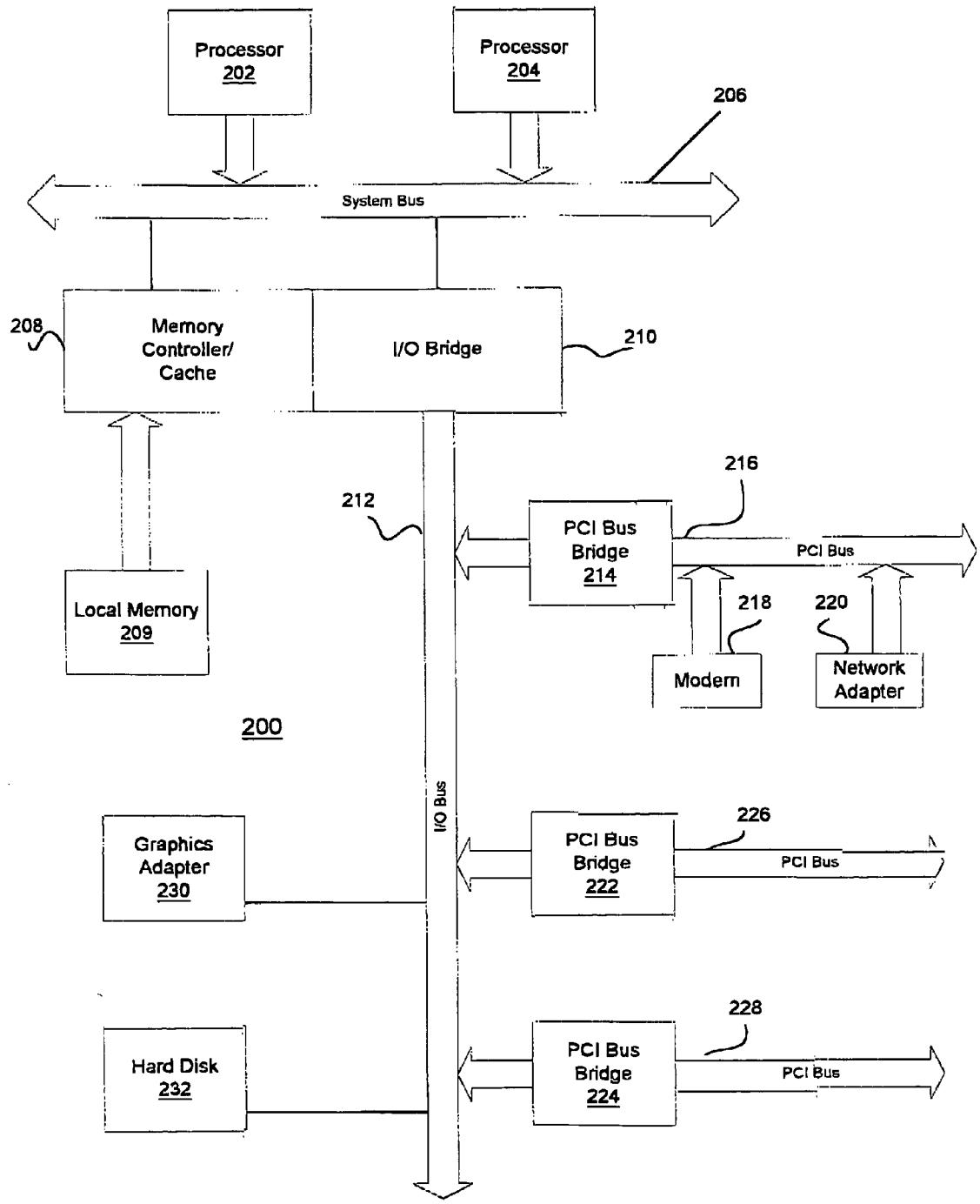
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. The processes of the present invention are implemented in a server, such as data processing system 200 in these examples. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
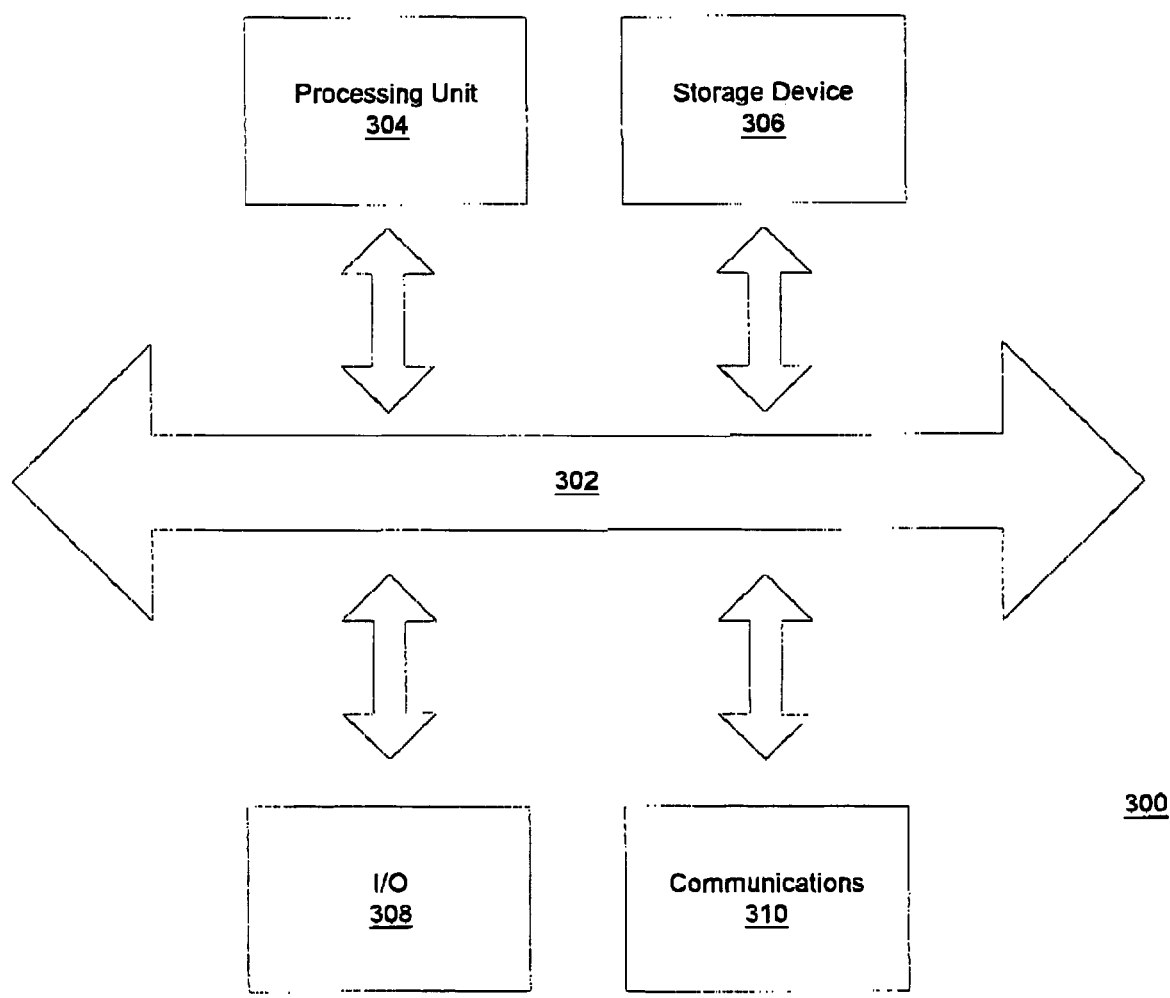
FIG. 3 is a block diagram of a client in accordance with a preferred embodiment of the present invention.

Turning next to FIG. 3, a block diagram of a client is depicted in accordance with a preferred embodiment of the present invention. In this example, data processing system 300 is an example of a client, such as client 108 or client 116 in FIG. 1. Data processing system 300 includes a bus 302, which interconnects and provides communication between processing unit 304, storage device 306, input/output (I/O) unit 308, and communications unit 310. Processing unit 304 may include one or more processors and executes instructions located in storage device 306. Storage device 306 contains instructions for performing various functions as well as data and may take various forms depending on the type of client. For example, storage device 306 may be a random access memory (RAM), a read-only memory (ROM), a non-volatile RAM (NVRAM), or a hard disk drive. I/O unit 308 provides interactive with data processing system 300 and typically includes a display device as well as an input device, such as a keyboard, touchpad, mouse, or touch screen. Communications unit 310 provides for exchanging data with other systems. Communications unit 310 may take various forms, such as, for example, a wireless modem or a network adapter. Data processing system 300 may take many forms, such as, for example, a PDA, kiosk, laptop computer, or a palm top computer.

The present invention provides a method, apparatus, and computer implemented instructions for translating content from a source format to a target format. The mechanism of the present invention allows for the use of both specific and generic transcoders based on a particular request from a client. The mechanism of the present invention allows for generic transcoder plug-ins with specific transcoder plug-ins (which are appropriate for a particular application, client device, and/or user) in a manner allowing a particular request to be handled by the most specific transcoding engine available. In this manner, specific transcoders may be used when available, but generic transcoders are used when specific ones are not available.

Figure 4:
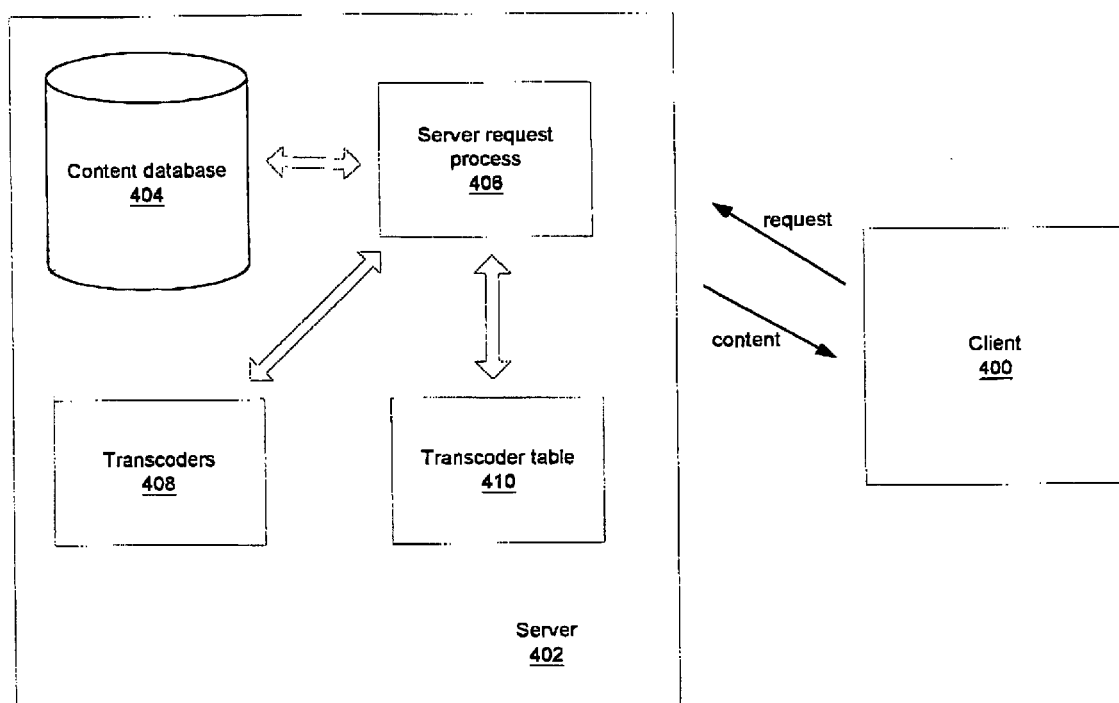
FIG. 4 is a block diagram illustrating selection of a transcoder for a request in accordance with a preferred embodiment of the present invention.

Turning next to FIG. 4, a block diagram illustrating selection of a transcoder for a request is depicted in accordance with a preferred embodiment of the present invention. In this example, client 400 sends a request to server 402 for content located in content database 404. Though not shown in FIG. 4, content database 404 may be located on a separate server and accessed by means of a direct database request or by means of a Web server request delivered over HTTP, WSP, or some other protocol. Also, the content delivered from this content database 404 may be generated dynamically, for example, by means of server-side applications such as Java servlets, Common-Gateway Interface (CGI) programs, Active Server Pages (ASPs), or JavaServer Pages. This request is processed by server request process 406. When the request is received, a transcoder is selected from transcoders 408 to translate content from content database 404 into a format for use by client 400. This selection of transcoders is performed using a transcoder table 410 to identify the appropriate transcoder from transcoders 408 to translate content from content database 404 into a desired or target content.

In these examples, the request received from client 400 is represented as a tuple of parameters containing a document type definition (DTD), an application, a device, and a user. The DTD defines the type of document, such as HTML or WML, requested by the client. The application identifies the type of application that is to receive the content, such as a mail program or a web browser. The device is used to identify the type of device that the content is to be processed or displayed on, such as, for example, a PDA or a desktop computer. The user name may be used to identify a specific user. A transcoder for a specific user may account for the user's particular color preferences, for example, screen layout preferences, or sound choices. Of course, other information may be included in the request to select a transcoder. For example, a network identification also may be included. Each transcoder in transcoders 408 is associated with a tuple with these associations being stored in transcoder table 410 in these examples.

The tuple associated with a transcoder may include a wild card or an absence of a particular parameter to indicate that that parameter is not specified for a particular transcoder. Server request process 406 performs a hierarchical search to find the most specific translator present for the request. In these examples, the search is initiated from most specificity to least specificity as follows: (DTD, application, device, user), (DTD, application, device, *), (DTD, application, *, *), (DTD, *, *, *), and (*, *, device, *) with "*" indicating a wild card. Alternative embodiments of the present invention may define different search templates and different orderings of these search templates to identify the most specific transcoder to apply to the particular request. In this manner, server request process 406 attempts to locate a transcoder exactly matching a particular application for a particular user and device. If such a transcoder is absent, server request process 406 then looks for an application specific transcoder for the device. If such a transcoder is absent, then a generic transcoder for the device is selected for use in translating the content.

Figure 5:
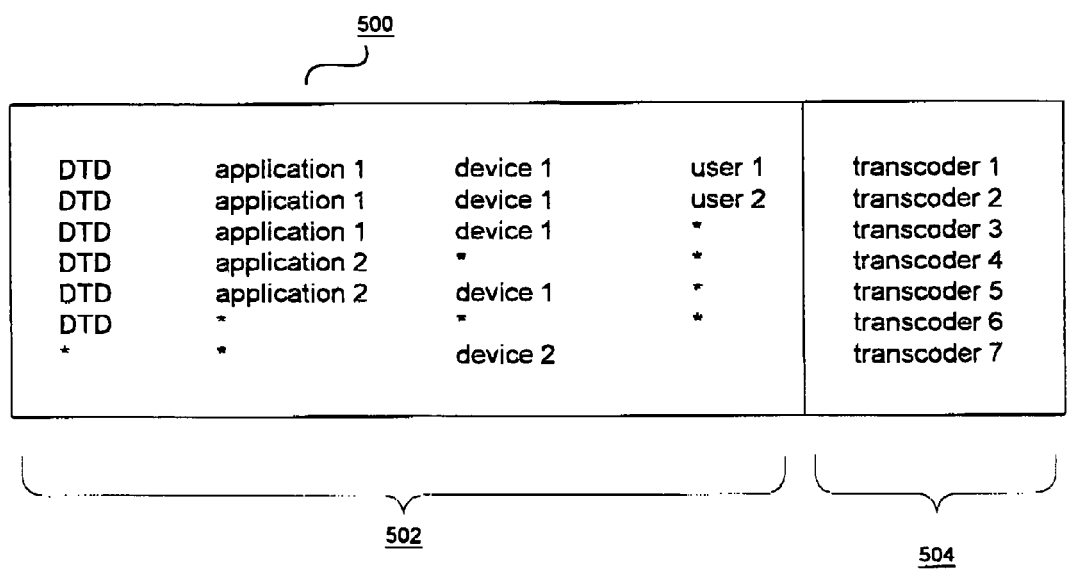
FIG. 5 is a diagram of a table of transcoder and tuple associations in accordance with a preferred embodiment of the present invention.

Referring now to FIG. 5, a diagram of a table of transcoder and tuple associations are depicted in accordance with a preferred embodiment of the present invention. In this example, table 500 is an example of a table, such as transcoder table 410 in FIG. 4. Table 500 includes tuples in column 502 and transcoders in column 504. Depending on the specificity of the request, a specific transcoder, such as transcoder 1 in column 504 may be selected or a more generic transcoder, such as transcoder 6 may be selected for use in translating content for the client.

Figure 6:
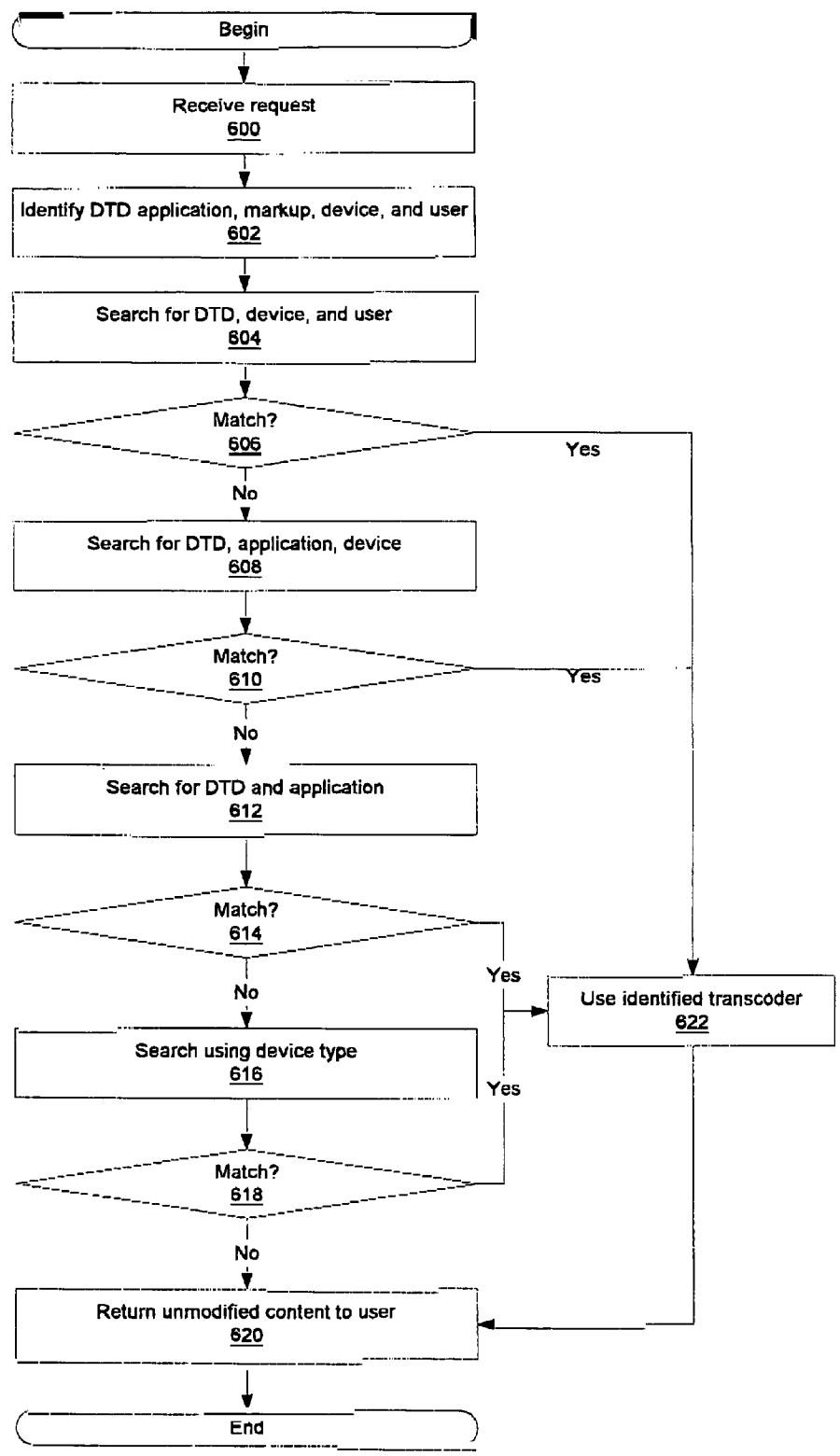
FIG. 6 is a flowchart of a process used for automated transcoder selection in accordance with a preferred embodiment of the present invention.

Turning next to FIG. 6, a flowchart of a process used for automated transcoder selection is depicted in accordance with a preferred embodiment of the present invention. The process illustrated in FIG. 6 may be implemented in a server request process, such as server request process 406 in FIG. 4 to automatically select a transcoder in response to receiving a request for content.

The process begins by receiving a request from a client (step 600). In these examples, the request includes a DTD, an application, a device, and a user in addition to an identification of the content desired by the client. These parameters are identified (step 602). A search for the particular DTD, device, and user is made (step 604). This search is made in a transcoder table, such as transcoder table 410 in FIG. 4. A determination is made as to whether a match is found (step 606). If a match is absent, a search for a more generic transcoder is performed based on DTD, application, and device from the request (step 608). A determination is made as to whether a transcoder matching these parameters is present (step 610). If a transcoder is absent for these parameters, a search using the DTD and the application is made (step 612). A determination is made as to whether a transcoder matching the particular DTD and application is present (step 614). If a match is absent, then a search using just the device type is made (step 616). A determination is made as to whether a transcoder matching the particular device is present (step 618). If no transcoder is found, then the unmodified content (or, in an alternative embodiment, an error) is returned to the user (step 620) with the process terminating thereafter. With reference again to steps 606, 610, 614, and 618, if a match is found in any of these searches, the identified transcoder is used to translate the content (step 622) with the process then proceeding to step 620 as described above.

Thus, the present invention provides an improved method and apparatus for automatically selecting a transcoder for translating content for a client. The mechanism of the present invention attempts to locate a transcoder using a hierarchical search to look for the most specific transcoder available for the request. The selection of the transcoder is based on the request and in particular based on the parameters included in the request. The mechanism of the present invention allows for a mixing of generic transcoders with more specific ones. In this manner, specific transcoders may be developed as needed or warranted while generic transcoders are available in the absence of a more specific one.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for transcoding content using a set of transcoders, the method comprising:
   receiving a request for the content from a client, wherein the request includes a set of characteristics;
   selecting a transcoder from the set of transcoders having a best match to the set of characteristics, wherein selecting a transcoder from the set of transcoders includes using the set of characteristics to perform a lookup of a transcoder corresponding to one or more characteristics in the set of characteristics in a transcoder data structure having entries for a plurality of transcoders; and
   transcoding the content using the transcoder to form transcoded content, wherein the set of transcoders includes one or more specific transcoders and one or more generic transcoders, and wherein if none of the one or more specific transcoders are a best match to the set of characteristics, a generic transcoder is selected.

2. The method of claim 1, wherein the set of characteristics includes an application characteristic identifying an application on the client that is to receive the content and a device characteristic identifying a type of device that the client is, and wherein selecting a transcoder includes:
attempting to find a best match transcoder in the transcoder data structure based on the application characteristic; and
if a best match transcoder is not found based on the application characteristic, attempting to find a best match transcoder in the transcoder data structure based on the device characteristic.

3. The method of claim 1, wherein the set of characteristics includes a user characteristic identifying a particular user of the client, and wherein the user characteristic is used to select a transcoder that meets output preferences of the user.

4. The method of claim 3, wherein the output preferences of the user include one or more of particular color preferences, screen layout preferences, and sound output preferences.

5. A method in a data processing system for transcoding content using a set of transcoders, the method comprising:
receiving a request for the content from a client, wherein the request includes a set of characteristics;
selecting a transcoder from the set of transcoders having a best match to the set of characteristics; and
transcoding the content using the transcoder to form transcoded content, wherein the set of characteristics includes a content type and a set of client characteristics wherein the set of transcoders includes one or more specific transcoders and one or more generic transcoders, and wherein if none of the one or more specific transcoders are a best match to the set of characteristics, a generic transcoder is selected.

6. A method in a data processing system for transcoding content using a set of transcoders, the method comprising:
receiving a request for the content from a client, wherein the request includes a set of characteristics;
selecting a transcoder from the set of transcoders having a best match to the set of characteristics; and
transcoding the content using the transcoder to form transcoded content, wherein the set of characteristics is a tuple including parameters for a document type definition, an application, a device, and a user wherein the set of transcoders includes one or more specific transcoders and one or more generic transcoders, and wherein if none of the one or more specific transcoders are a best match to the set of characteristics, a generic transcoder is selected.

7. A method in a data processing system for transcoding content using a set of transcoders, the method comprising:
receiving a request for the content, wherein the request includes identification information for a client originating the request;
selecting a transcoder from the set of transcoders, wherein the transcoder provides a closest match to the identification information, wherein selecting a transcoder from the set of transcoders includes using the identification information for the client originating the request to perform a lookup of a transcoder corresponding to the identification information for the client originating the request in a transcoder data structure having entries for a plurality of transcoders; and
processing the content using the transcoder wherein the set of transcoders includes one or more specific transcoders and one or more generic transcoders, and wherein if none of the one or more specific transcoders are a best match to the set of characteristics, a generic transcoder is selected.

8. The method of claim 7, wherein the identification information comprises a content type and a set of client characteristics.

9. The method of claim 7, wherein the identification information comprises a document type definition, an application, a device, and a user.

10. The method of claim 7, wherein the set of transcoders includes one or more specific transcoders and one or more generic transcoders, and wherein if none of the one or more specific transcoders are a best match to the identification information for the client originating the request, a generic transcoder is selected.

11. The method of claim 7, wherein the identification information for the client originating the request includes information identifying an application on the client that is to receive the content and information identifying a type of device that the client is, and wherein selecting a transcoder includes:
attempting to find a best match transcoder in the transcoder data structure based on the information identifying the application; and
if a best match transcoder is not found based on the information identifying the application, attempting to find a best match transcoder in the transcoder data structure based on the information identifying the type of device.

12. The method of claim 7, wherein the identification information for a client originating the request includes information identifying a particular user of the client, and wherein the information identifying the particular user is used to select a transcoder that meets output preferences of the particular user.

13. A data processing system comprising:
a bus system;
a communications unit connected to the bus system;
a memory connected to the bus system, wherein the memory includes as set of instructions; and
a processing unit connected to the bus system, wherein the processing unit executes the set of instructions to receive a request for the content from a client through the communications unit in which the request includes a set of characteristics, select a transcoder from the set of transcoders having a best match to the set of characteristics, wherein selecting a transcoder from the set of transcoders includes using the set of characteristics to perform a lookup of a transcoder corresponding to one or more characteristics in the set of characteristics in a transcoder data structure having entries for a plurality of transcoders, and transcode the content using the transcoder to form transcoded content, wherein the set of transcoders includes one or more specific transcoders and one or more generic transcoders, and wherein if none of the one or more specific transcoders are a best match to the set of characteristics, a generic transcoder is selected.

14. A data processing system for transcoding content using a set of transcoders, the data processing system comprising:
receiving means for receiving a request for the content from a client, wherein the request includes a set of characteristics;

selecting means for selecting a transcoder from the set of transcoders having a best match to the set of characteristics, wherein selecting means for selecting a transcoder from the set of transcoders includes using means for using the set of characteristics to perform a lookup of a transcoder corresponding to one or more characteristics in the set of characteristics in a transcoder data structure having entries for a plurality of transcoders; and transcoding means for transcoding the content using the transcoder to form transcoded content, wherein the set of transcoders includes one or more specific transcoders and one or more generic transcoders, and wherein if none of the one or more specific transcoders are a best match to the set of characteristics, a generic transcoder is selected.

15. The data processing system of claim 14, wherein the set of characteristics includes a content type and a set of client characteristics.

16. The data processing system of claim 14, wherein the set of characteristics is a tuple including parameters for a document type definition, an application, a device, and a user.

17. The data processing system of claim 14, wherein the set of characteristics includes an application characteristic identifying an application on the client that is to receive the content and a device characteristic identifying a type of device that the client is, and wherein selecting a transcoder includes:
  attempting to find a best match transcoder in the transcoder data structure based on the application characteristic; and
  if a best match transcoder is not found based on the application characteristic, attempting to find a best match transcoder in the transcoder data structure based on the device characteristic.

18. A data processing system for transcoding content using a set of transcoders, the data processing system comprising:
  receiving means for receiving a request for the content, wherein the request includes identification information for a client originating the request;
  selecting means for selecting a transcoder from the set of transcoders, wherein the transcoder provides a closest match to the identification information, wherein selecting means for selecting a transcoder from the set of transcoders includes using means for using the identification information for the client originating the request to perform a lookup of a transcoder corresponding to the identification information for the client originating the request in a transcoder data structure having entries for a plurality of transcoders; and
  processing means for processing the content using the transcoder wherein the set of transcoders includes one or more specific transcoders and one or more generic transcoders, and wherein if none of the one or more specific transcoders are a best match to the set of characteristics, a generic transcoder is selected.

19. The data processing system of claim 18, wherein the identification information comprises a content type and a set of client characteristics.

20. The data processing system of claim 18, wherein the identification information comprises a document type definition, an application, a device, and a user.

21. The data processing system of claim 18, wherein the identification information for the client originating the request includes information identifying an application on the client that is to receive the content and information identifying a type of device that the client is, and wherein selecting a transcoder includes:
  attempting to find a best match transcoder in the transcoder data structure based on the information identifying the application; and
  if a best match transcoder is not found based on the information identifying the application, attempting to find a best match transcoder in the transcoder data structure based on the information identifying the type of device.

22. A computer program product in a computer readable medium for use in a data processing system for transcoding content using a set of transcoders, the computer program product comprising:
  first instructions for receiving a request for the content from a client, wherein the request includes a set of characteristics;
  second instructions for selecting a transcoder from the set of transcoders having a best match to the set of characteristics, wherein second instructions for selecting a transcoder from the set of transcoders includes third instructions for using the set of characteristics to perform a lookup of a transcoder corresponding to one or more characteristics in the set of characteristics in a transcoder data structure having entries for a plurality of transcoders; and
  fourth instructions for transcoding the content using the transcoder to form transcoded content, wherein the set of transcoders includes one or more specific transcoders and one or more generic transcoders, and wherein if none of the one or more specific transcoders are a best match to the set of characteristics, a generic transcoder is selected.

23. A computer program product in a computer readable medium for use in a data processing system for transcoding content using a set of transcoders, the computer program product comprising:
  first instructions for receiving a request for the content, wherein the request includes identification information for a client originating the request;
  second instructions for selecting a transcoder from the set of transcoders, wherein the transcoder provides a closest match to the identification information, wherein second instructions for selecting a transcoder from the set of transcoders includes third instructions for using the identification information for the client originating the request to perform a lookup of a transcoder corresponding to the identification information for the client originating the request in a transcoder data structure having entries for a plurality of transcoders; and
  fourth instructions for processing the content using the transcoder wherein the set of transcoders includes one or more specific transcoders and one or more generic transcoders, and wherein if none of the one or more specific transcoders are a best match to the set of characteristics, a generic transcoder is selected.

* * * * *